United States Patent
Rondinone et al.

(10) Patent No.: US 12,507,042 B2
(45) Date of Patent: Dec. 23, 2025

(54) METHOD AND SYSTEM FOR SELECTIVE BROADCAST ACKNOWLEDGMENT IN WIRELESS VEHICULAR COMMUNICATION

(71) Applicants: Hyundai Motor Company, Seoul (KR); Kia Corporation, Seoul (KR)

(72) Inventors: Michele Rondinone, Frankfurt Am Main (DE); Javier Gozálvez Sempere, Alicante (ES); Baldomero Coll Perales, Alicante (ES); Miguel Sepulcre Ribes, Alicante (ES)

( * ) Notice: Subject to any disclaimer, the term of this patent is extended or adjusted under 35 U.S.C. 154(b) by 305 days.

(21) Appl. No.: 18/377,923

(22) Filed: Oct. 9, 2023

(65) Prior Publication Data

US 2024/0323652 A1  Sep. 26, 2024

(30) Foreign Application Priority Data

Mar. 20, 2023  (DE) .......................... 102023106837.7

(51) Int. Cl.
  *H04W 4/06*  (2009.01)
  *H04W 4/40*  (2018.01)
  *H04W 8/00*  (2009.01)

(52) U.S. Cl.
  CPC ............... *H04W 4/06* (2013.01); *H04W 4/40* (2018.02); *H04W 8/005* (2013.01)

(58) Field of Classification Search
  CPC .......... G08G 1/166; H04W 4/06; H04W 4/08; H04W 4/38; H04W 4/40–48; H04W 8/005
  See application file for complete search history.

(56) References Cited

U.S. PATENT DOCUMENTS

| 8,436,751 B2 | 5/2013 | Haran | |
| 9,959,752 B2 | 5/2018 | Rech et al. | |
| 2009/0310608 A1* | 12/2009 | Chen | H04W 4/90 370/389 |
| 2012/0108163 A1* | 5/2012 | Bai | H04L 12/189 455/3.06 |
| 2016/0227380 A1* | 8/2016 | Zhang | H04W 4/90 |
| 2017/0015263 A1* | 1/2017 | Makled | G06V 20/597 |

(Continued)

OTHER PUBLICATIONS

B.Coll-Perales et al., "Context-based Broadcast Acknowledgement for Enhanced Reliability of Cooperative V2X Messages", proceedings of IEEE Forum on Integrated and Sustainable Transportation System 2020.

*Primary Examiner* — Thomas R Cairns
(74) *Attorney, Agent, or Firm* — Banner & Witcoff, Ltd.

(57) ABSTRACT

A method and a system for selective broadcast acknowledgment in wireless vehicular communication are disclosed. According to a method, a computing device may receive wireless messages from vehicles, store information based on the received wireless messages, determine, for a pair of vehicles, whether information from one vehicle of the pair of vehicles is relevant to operation of a vehicle application being executed on another vehicle of the pair of vehicles, and compile acknowledger lists. Each acknowledger list may indicate, for a respective vehicle, one or more vehicles that are verified as being relevant to the respective vehicle. The computing device may transmit the acknowledger lists to the vehicles, and cause the vehicles to perform a selective broadcast acknowledgement process based on the acknowledger lists.

15 Claims, 4 Drawing Sheets

(56) References Cited

U.S. PATENT DOCUMENTS

| | | | | |
|---|---|---|---|---|
| 2021/0213978 | A1* | 7/2021 | Edling | B60W 60/00276 |
| 2021/0383695 | A1* | 12/2021 | Kose Cihangir | G08G 1/163 |
| 2023/0300616 | A1* | 9/2023 | Petit | H04W 12/66 |
| | | | | 726/22 |
| 2023/0354002 | A1* | 11/2023 | Shuman | G08G 1/096741 |
| 2023/0403595 | A1* | 12/2023 | Shuman | H04W 28/0215 |
| 2024/0038058 | A1* | 2/2024 | Sadu | H04L 67/12 |
| 2024/0179492 | A1* | 5/2024 | Vassilovski | G08G 1/166 |

* cited by examiner

METHOD AND SYSTEM FOR SELECTIVE BROADCAST ACKNOWLEDGMENT IN WIRELESS VEHICULAR COMMUNICATION

CROSS-REFERENCE TO RELATED APPLICATION

This application claims the benefit of priority to German Patent Application No. 102023106837.7, filed in the German Patent and Trade Mark Office on Mar. 20, 2023, the entire contents of which are incorporated herein by reference.

TECHNICAL FIELD

The present disclosure pertains to a method and a system for selective broadcast acknowledgment in wireless vehicular communication as well as to vehicles configured to participate in such a system.

BACKGROUND

Modern cars are increasingly equipped with wireless communication devices, in particular for vehicle-to-everything (V2X) communication, on which basis information may be communicated from a vehicle to any entity that may affect the vehicle or that may be affected by it. Such a vehicular communication system may incorporate other more specific types of communication, in particular V2V communication, that is, wireless vehicle-to-vehicle communication. V2X technology does not only improve traffic flow but may also help to make traffic safer and driving more convenient.

Today, safety-related V2X applications (e.g., collision avoidance, vulnerable road user protection, emergency braking notification, lane merging etc.) are often based on periodic broadcast transmission of small-sized messages that are transmitted from each vehicle to all possible receivers simultaneously and that include information on a vehicle's location, speed, acceleration, direction and so on. For these applications V2X technologies with limited data rate are conventionally used (e.g., IEEE 802.11p or LTE-V2X).

Reliability of such broadcast transmissions could in principle be improved by using acknowledgements (ACK) of message receptions from addressed vehicles. However, ACKs are typically not used with the above-mentioned technologies as it is considered too inefficient and too complex to coordinate ACKs from all receivers to the same sender, e.g., because the transmitting vehicle does not or cannot know the potential receiving vehicles in advance.

Newer V2X technologies (e.g., IEEE 802.11bd) plan to introduce selective broadcast acknowledgement mechanisms, in which the transmitting vehicle can request ACKs from specific receiving vehicles, so called acknowledgers, depending on the requirements of the respective application. In that case, a message may be retransmitted a number of times until an ACK is received from a specific vehicle, which is feasible and efficient.

The respective standards do not specify how to select the acknowledgers. This is usually done based on the relevance of the candidate receivers in the respective V2V application, which may rely on the capability of the transmitting vehicle to locally detect the presence and dynamics of receiving vehicles. Reliance on direct V2V communications between transmitting and candidate receiving vehicles may, however, be affected by environmental factors, e.g., the presence of obstacles. These factors can cause a delay in the selection of the acknowledgers, hence jeopardizing the effectiveness of V2V applications.

Document U.S. Pat. No. 8,436,751 B2 teaches a method for preventing collisions of multiple V2V broadcast transmissions, which uses local maps to select a pivot vehicle in a favorable position for transmitting a "clear to send" that silences potentially colliding transmissions.

Document U.S. Pat. No. 9,959,752 B2 describes a system to relay V2V messages that are blocked by obstacles, e.g., a wall. Messages received from one side of a wall are relayed using a distinct antenna at the other side. Messaged are relayed only if the content is considered relevant for the receivers at the other side.

SUMMARY

In light of the above, there is a need to find solutions for effectively and timely selecting broadcast acknowledgers in wireless vehicular communication.

To this end, the present disclosure provides one or more methods, one or more wireless vehicular communication systems, and one or more motor vehicles.

According to one or more embodiments of the present disclosure, a method may include: receiving, by a computing device, a plurality of wireless messages from a plurality of vehicles having wireless communication capability, wherein the computing device is one of a stationary device or a mobile device; storing, by the computing device and based on the plurality of received wireless messages, information for each vehicle of the plurality of vehicles; determining, by the computing device, based on the stored information, and for a pair of vehicles of the plurality of vehicles, whether information from one vehicle of the pair of vehicles is relevant to operation of a vehicle application being executed on another vehicle of the pair of vehicles; compiling, by the computing device and based on the determination, a plurality of acknowledger lists, wherein each acknowledger list of the plurality of acknowledger lists indicates, for a respective vehicle of the plurality of vehicles, one or more vehicles that are verified as being relevant to the respective vehicle; transmitting each acknowledger list of the plurality of acknowledger lists to the respective vehicle; and causing the plurality of vehicles to perform a selective broadcast acknowledgment process based on the plurality of acknowledger lists.

The computing device may be integrated in one of a roadside unit or a vehicle.

The computing device may communicate with the plurality of vehicles via vehicle-to-everything (V2X) communication.

The method may further include supplementing the stored information with sensor data on the plurality of vehicles. The sensor data may be provided by a sensor system associated with the computing device.

The vehicle application may be related to vehicle safety. The plurality of wireless messages may include at least one of a cooperative awareness message, a collective perception message, or a maneuver coordination message.

The method may further include: adjusting, based on a broadcast acknowledgment not being received during the selective broadcast acknowledgment process of each vehicle, at least one of a wireless transmission parameter of the respective vehicle or a vehicle operation parameter.

The method may further include: receiving, by the computing device, an acknowledgement reception confirmation indicating that each vehicle in an acknowledger list has positively acknowledged with the selective broadcast acknowledgment process; and removing, by the computing device, each positively acknowledged vehicle from the acknowledger list.

According to one or more embodiments of the present disclosure, a wireless vehicular communication system may include: a computing device configured as one of a stationary device or a mobile device. The computing device may include: one or more processors, and memory. The memory may store instructions that, when executed by the one or more processors, cause the computing device to: receive a plurality of wireless messages from a plurality of vehicles having wireless communication capability; store, based on the plurality of received wireless messages, information for each vehicle of the plurality of vehicles; determine, based on the stored information and for a pair of vehicles of the plurality of vehicles, whether information from one vehicle of the pair of vehicles is relevant to operation of a vehicle application being executed on another vehicle of the pair of vehicles; compile, based on the determination, a plurality of acknowledger lists, wherein each acknowledger list of the plurality of acknowledger lists indicates, for a respective vehicle of the plurality of vehicles, one or more vehicles that are verified as being relevant to the respective vehicle; and transmit each acknowledger list of the plurality of acknowledger lists to the respective vehicle; cause the plurality of vehicles to perform a selective broadcast acknowledgment process based on the plurality of acknowledger lists.

According to one or more embodiments of the present disclosure, a motor vehicle may include: one or more processors, and memory. The memory may store instructions that, when executed by the one or more processors, cause the motor vehicle to: send a wireless message to a computing device; receive, from the computing device, an acknowledger list indicating one or more vehicles that are verified as being relevant to operation of a vehicle application being executed on the motor vehicle; perform, based on the acknowledger list, a selective broadcast acknowledgement process with respect to the one or more vehicles; and sending, to the computing device, an acknowledgement reception confirmation indicating that each vehicle of the one or more vehicles in the acknowledger list has positively acknowledged with the selective broadcast acknowledgement process.

According to the present disclosure, the selection of broadcast acknowledgers may be improved by introducing an intermediary between the transmitting and the receiving vehicles, a so-called acknowledger selector, which can be a stationary and/or moving entity wirelessly communicating with the surrounding vehicles. The acknowledger selector exploits its favorable position between the vehicles to estimate the relevance of each vehicle as candidate acknowledger for applications running on the respective vehicle. For example, the acknowledger selector may be a V2X-equipped car or roadside unit that continuously runs a method for selection of acknowledgers for V2V broadcast transmissions between the vehicles.

To this end, the acknowledger selector may be provided with a catalog of vehicle application-specific relevance check algorithms, through which it can dynamically select the vehicles that shall acknowledge reception of broadcast transmissions to a specific transmitting vehicle. As relevance checks give positive results, the selector may inform the transmitting vehicle with a list containing the identity of the selected acknowledgers and update this list dynamically. The transmitting vehicle may then use this list to more effectively run the standard selective broadcast acknowledgment operation.

In this vein, acknowledgement information may be processed more timely and acknowledgers may be selected more precisely. As a consequence, the disclosure helps to reduce redundant acknowledgment-related wireless traffic over the respective communication channels. Moreover, information about relevant acknowledgers may be used at both radio access and application layer of the transmitting vehicle to improve safety and/or comfort. As acknowledger information are processed earlier at radio access layer, the transmitting vehicle can react earlier to increase the reliability of its transmissions (e.g., retransmitting a non-acknowledged packet, increase the transmission power, use more robust modulation/coding schemes etc.). Furthermore, as acknowledger information are processed earlier at application layer, the transmitting vehicle can react earlier to ensure application correctness and effectiveness (e.g., slowing down in reaction to non-acknowledged messages etc.).

BRIEF DESCRIPTION OF THE DRAWINGS

The accompanying drawings are included to provide a further understanding of the present disclosure and are incorporated in and constitute a part of this specification. The drawings illustrate the embodiments of the present disclosure and together with the description serve to explain the principles of the disclosure. Embodiments of the present disclosure and many of the intended advantages of the present invention will be readily appreciated as they become better understood by reference to the following detailed description. The elements of the drawings are not necessarily to scale relative to each other. In the figures, like reference numerals denote like or functionally like components, unless indicated otherwise.

Figure 1:
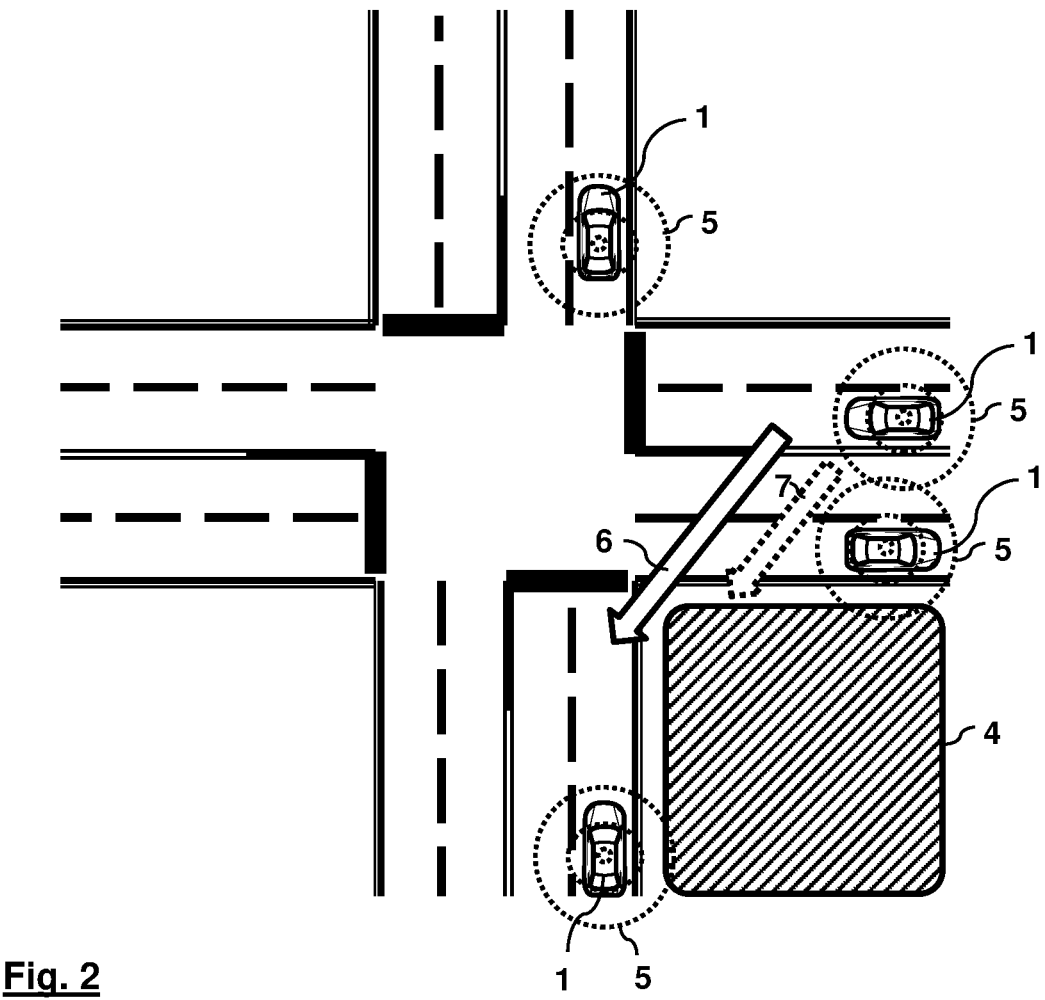
FIG. 1 schematically depicts an exemplary driving situation for several wirelessly communicating vehicles.

Although specific embodiments are illustrated and described herein, it will be appreciated by those of ordinary skill in the art that a variety of alternate and/or equivalent implementations may be substituted for the specific embodiments shown and described without departing from the scope of the present disclosure. Generally, this application is intended to cover any adaptations or variations of the specific embodiments discussed herein.

DETAILED DESCRIPTION

Presently, the vehicles particularly rely on broadcast transmission (one-to-all), which refers to transmissions addressed to all receivers simultaneously. In other words, the term broadcast refers to a content that is not addressed to a particular vehicle but to all vehicles (and potentially also any other recipients) that receive it. This stands in contrast to unicast transmissions (one-to-one), which refers to transmissions addressed specifically to one receiver. A broadcast transmission may particularly be omnidirectional, i.e. radiated in all directions (directional broadcast transmissions are however also possible in principle).

It is understood that the term "vehicle" or "vehicular" or other similar term as used herein is inclusive of motor vehicles in general such as passenger automobiles including sports utility vehicles (SUV), buses, trucks, various commercial vehicles, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Advantageous embodiments and improvements of the present disclosure are found in the subordinate claims.

The acknowledger selector may be integrated in a roadside unit or a vehicle.

For example, the acknowledger selector may be a vehicle equipped with V2X communication means, e.g., for V2V applications. Hence, in principle, any wirelessly communicating vehicle may serve as acknowledger selector, either permanently or temporarily (e.g., sporadically depending on the respective situation and/or application).

Alternatively, the selector may also be provided as a stationary road side unit that is provided for this particular purpose. For example, such a device may be installed at a road junction or the like where it may help to improve traffic safety, in particular in case the area around the junction adversely affects wireless communication between approaching vehicles (e.g., due to large buildings or other obstacles around the junction).

It is to be understood, however, that also combinations of the above solutions are possible including stationary as well as movable devices.

The acknowledger selector and/or the vehicles may communicate via V2X.

Hence, the acknowledger selector may be equipped with V2X technologies able to receive one or multiple types of standard V2X messages from multiple transmitters. The vehicles may then communicate via V2V, for example.

The acknowledger selector as well as the communicating vehicles may, however, be generally equipped with any communication technology (not necessarily a V2X technology) allowing timely communication of selected acknowledger lists. Moreover, the acknowledger selector may be configured to run artificial intelligent algorithms able to perform the relevance verification in a predictive way (predict future relevance of V2X info based on current situations and conditions).

The method may further comprise supplementing the message specific information with sensor data provided by a sensor system of the acknowledger selector on the surrounding vehicles. Accordingly, the acknowledger selector may be further configured to supplement the message specific information with sensor data provided by a sensor system of the acknowledger selector on the surrounding vehicles.

For example, the acknowledger selector may be equipped with local sensors (e.g., radar, lidar, camera etc.). Local sensor detections can then be used to confirm or improve the precision of any information received via V2X from the surrounding vehicles (e.g., vehicle position, speed, acceleration, direction and so on). For example, the precision data of the respective sensors may be fused with the information provided by nearby vehicles. It is to be understood, however, that sensor data of the selector may also be supplemented or substituted by sensor data coming from other sensors, e.g., sensor installed within the environment, on other vehicles etc.

The vehicle applications may comprise safety related driving applications.

For example, the disclosure may be used to ensure reliability in safety critical V2V applications like cooperative automated driving or the like.

The wireless messages may comprise cooperative awareness messages, collective perception messages and/or maneuver coordination messages.

In general, however, the present solution applies equally to any kind of standard message type. Depending on the message type and the respective application, different kinds of information may be stored and processed with different application relevance check rules.

Cooperative awareness messages (CAM) are status information about traffic flow, vehicle position, travel speed, travel direction, vehicle condition and so on that are usually exchanged between vehicles using V2V communication or via roadside units using V2X communication. These kinds of messages are sent out periodically, e.g., once per second.

Similarly, collective perception messages (CPM) are exchanged to share of information about detected objects and obstacles. Maneuver coordination messages (MCM) on the other hand are used in cooperative maneuvers of vehicles with or without road infrastructure support.

If a broadcast acknowledgment is not received during the selective broadcast acknowledgment process of each vehicle, wireless transmission parameters of the respective vehicle and/or vehicle operation parameters depending on the respective vehicle application may be adjusted.

In other words, the acknowledger information can be used at radio access as well as application layer of the transmitting vehicle to improve safety and/or comfort. In one example, knowing about the presence of acknowledgers without receiving acknowledgements from them can be used at radio access layer such that a transmitter can earlier increase the reliability of its transmissions (e.g., retransmitting a non-acknowledged packet, increase the transmission power etc.). In another example, the same condition can trigger a reaction at application layer such that a transmitter ensures application correctness earlier (e.g., slow down to avoid a collision in reaction to a non-acknowledged message).

The method may further comprise communicating an acknowledgement reception confirmation to the acknowledger selector for each vehicle from the respective acknowledger list being positively acknowledged with the selective broadcast acknowledgment process, the acknowledger selector removing each respectively confirmed vehicle from the respective acknowledger list. Accordingly, each vehicle may be configured to communicate an acknowledgement reception confirmation to the acknowledger selector for each vehicle from the respective acknowledger list being positively acknowledged with the selective broadcast acknowledgment process and the acknowledger selector may be configured to remove each respectively confirmed vehicle from the respective acknowledger list.

Hence, if a vehicle receives an acknowledgment from another vehicle, it may inform the selector with an "ACK reception confirmation" or the like so that the latter can update the acknowledger list and eventually stop transmitting it (in case no vehicle is left on it to request an acknowledgment from).

The disclosure will be explained in greater detail with reference to exemplary embodiments depicted in the drawings as appended.

FIG. 1 schematically depicts an exemplary driving situation for several wirelessly communicating vehicles 1, which are approaching or leaving an intersection of several roads.

The vehicles 1 are equipped with V2V communication equipment to periodically broadcast wireless messages to each other (broadcast transmission 5). For example, the vehicles 1 may broadcast CAM messages with ego position, speed, direction and the like to each other. Based on these information, the vehicles 1 may run an automated collision avoidance application requiring high communication reliability (i.e. transmitted messages need to be received with high probability). In other examples, the vehicles 1 may also broadcast other types of messages relevant for various safety related driving applications, e.g., CPM and/or MCM messages.

A V2X radio access technology can provide reliability by requesting message reception acknowledgments from receivers.

If an acknowledgment for a transmitted message is not received, the message may be retransmitted a number of times until the acknowledgment is received or a maximum number of retransmissions has been reached.

However, for broadcast transmissions (one vehicle transmits, all others receive) the transmitter should make sure that acknowledgments are received from all recipient vehicles 1. In this case, the transmitter typically does not or cannot know in advance about the addressed receivers, so requesting acknowledgments is not particularly meaningful. Even assuming that the transmitter knows the receivers, it might need multiple retransmissions until all the acknowledgments are received, which is inefficient, particularly considering that acknowledgments from multiple receivers need to be coordinated.

IEEE 802.11bd radio access technology provides reliability via selective broadcast acknowledgements. If an acknowledgment for a transmitted message is not received, the message is retransmitted a number of times until the acknowledgment is received. In selective broadcast acknowledgement, the V2X technology radio access layer knows who are the addressed receivers from which the acknowledgment shall be requested: acknowledgments are individually requested only from them. The acknowledgers may be selected based on application needs.

In the depicted example of FIG. 1, an acknowledgment may thus be requested only from vehicles 1 that are heading towards the intersection, because only these vehicles 1 are considered by the collision avoidance application to imply a potential risk.

Such a solution based on selective broadcast acknowledgements would be efficient and feasible. However, due to shielding effects generated by obstacles (e.g., a building 4 or other stationary structure as shown in FIG. 1), for example at 5.9 GHz in case of 802.11bd radio access technology, reception of broadcast transmissions 5 may be problematic (e.g., blocked transmission 7 in FIG. 1).

In the example of FIG. 1, both vehicles 1 approaching the intersection may thus not know about each other and hence cannot (immediately) request an acknowledgment. This may only be possible once the vehicles 1 get closer to the center of the intersection such that the upper right vehicle 1 may acknowledge reception of the broadcast transmission 5 of the vehicle 1 at the bottom of FIG. 1 (and vice versa) in case the collision avoidance application considers the respective other vehicle 1 to be relevant (e.g., based on received position, speed, heading etc.). However, the vehicles 1 may then be already very close to each other. Hence, it would be beneficial if discovery and selection of any necessary acknowledger could be anticipated.

Figure 2:
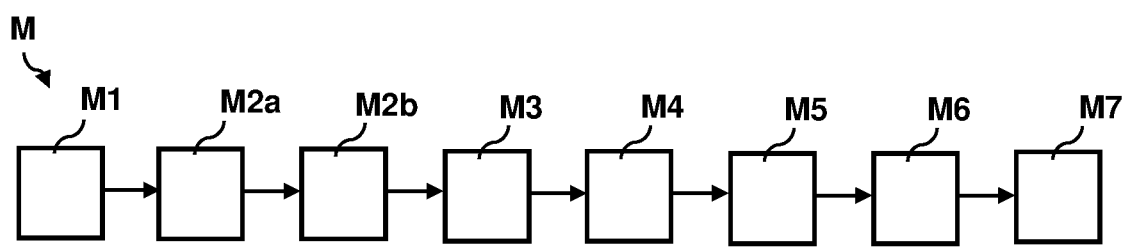
FIG. 2 shows a flow diagram of a method for selective broadcast acknowledgment in wireless vehicular communication.
Figure 3:
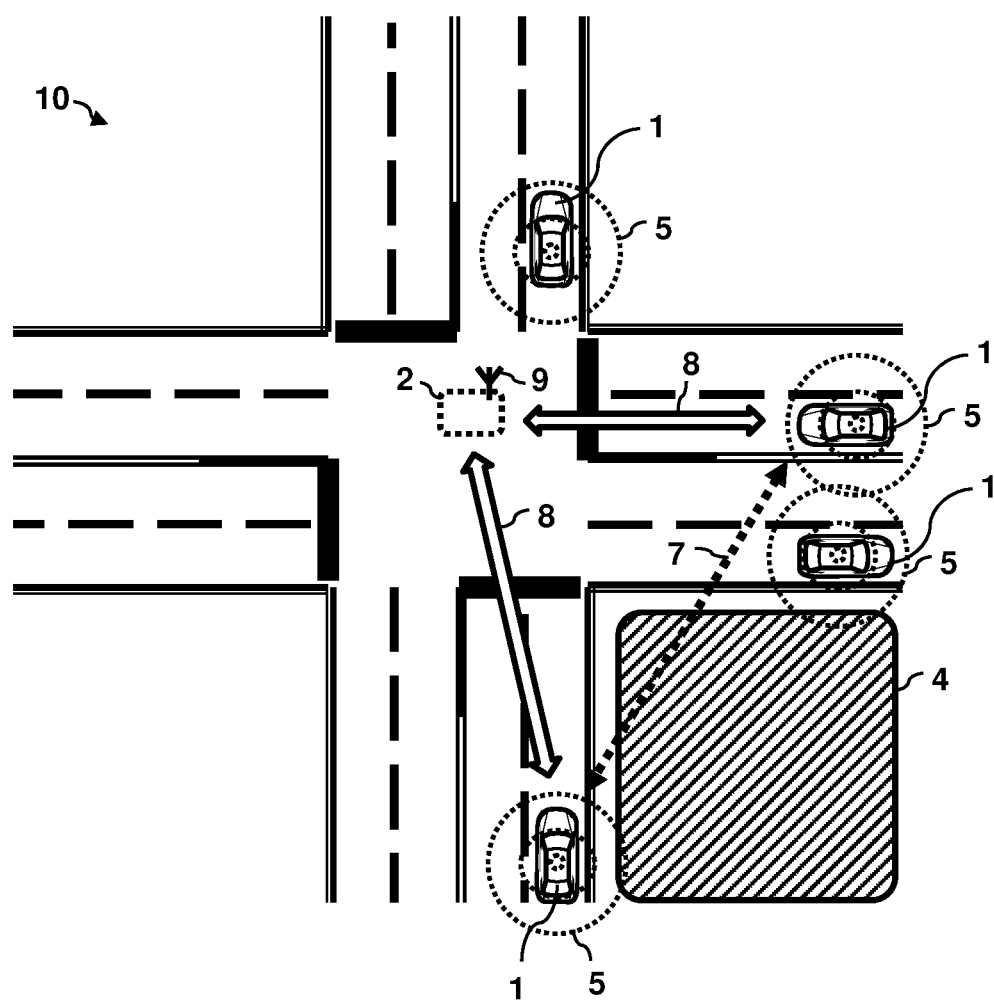
FIG. 3 schematically shows the driving situation of FIG. 1 using a wireless vehicular communication system with selective broadcast acknowledgment in line with the method of FIG. 2.

FIG. 2 shows a flow diagram of a method M for selective broadcast acknowledgment in wireless vehicular communication, which may be provided to overcome the above problems. FIG. 3 schematically shows the driving situation of FIG. 1 using a wireless vehicular communication system 10 with selective broadcast acknowledgment in line with the method M of FIG. 2.

The method M may include, under M1, constantly receiving wireless messages with an acknowledger selector 2 from all surrounding wirelessly communicating vehicles 1. The acknowledger selector 2 may be a stationary (e.g., a road side unit as depicted in FIG. 3) and/or a moving entity (e.g., a vehicle, the further example in FIG. 5). The acknowledger selector 2 may be, for example, a computing device that includes one or more processors and memory storing instructions that, when executed by the one or more processors, may cause the computing device to perform one or more actions as described in the present disclosure with reference to the acknowledger selector 2. Wireless messages may be of (but not limited to) a certain predefined or standard type, e.g., CAM, CPM and/or MCM messages.

The method M further comprises under M2a storing message-specific information for each vehicle 1 by the acknowledger selector 2 based on the received wireless messages. For example, the selector 2 may store message-specific information of the transmitting vehicle 1 like position and dynamics (in case of CAM messages), planned and desired trajectories (in case of MCM messages) and/or detected objects (in case of CPM messages). However, the present solution generally applies equally to any kind of predefined or standard message type. Depending on the message type, different kind of information can be stored and processed accordingly.

The method M may optionally further comprise under M2b supplementing the message specific information with sensor data provided by a sensor system 9 of the acknowledger selector 2 on the surrounding vehicles 1 in order to improve the precision of the data available from the transmitting vehicles 1 and the correctness of relevance verification algorithms.

Next, the method M comprises under M3 running a relevance verification algorithm based on the stored message-specific information by the acknowledger selector 2 for each pair of vehicles 1 according to pre-defined rules established for a plurality of vehicle applications. More specifically, it is verified for each pair of vehicles 1 whether information from one of the two vehicles 1 is relevant for the operation of the respective other vehicle 1 for at least one of the vehicle applications being executed on the respective other vehicle 1.

Hence, the selector 2 continuously runs relevance checks following rules of pre-defined applications, e.g., based on speed and direction a check may provide the info that a collision between vehicles 1 may be possible in principle. A list of pre-defined applications may be provided together with the corresponding rules. It is to be understood, however, that such a list is not fixed and may be changed dynamically during operation.

Next, the method M comprises under M4 compiling an acknowledger list by the acknowledger selector 2 for each vehicle 1, the acknowledger list specifying all other vehicles 1 for which the respective vehicle 1 is verified as relevant. This list may get updated continuously during operation of the system 10.

Under M5, the method M then comprises transmitting the respective acknowledger list to each respective vehicle 1, and under M6 running a selective broadcast acknowledgment process on each vehicle 1, taking into account the respective acknowledger list specifying from which of the respectively surrounding vehicles 1 a broadcast acknowledgment is requested by the respective vehicle 1.

Finally, the method M comprises under M7 communicating an acknowledgement reception confirmation to the acknowledger selector 2 for each vehicle 1 from the respective acknowledger list being positively acknowledged with the selective broadcast acknowledgment process, the acknowledger selector 2 then removing each respectively confirmed vehicle 1 from the respective acknowledger list. Hence, the list may get updated continuously. If a list gets empty at some point, the selector 2 may then eventually stop transmitting it to the respective vehicle 1.

In the exemplary case of FIG. 3, a roadside unit at the intersection center serves as acknowledger selector 2. It overhears messages from all depicted vehicles 1 in the vicinity of the intersection, e.g., CAM messages. In the example of FIG. 3, CAM messages of the vehicle 1 at the bottom of the figure are for example only relevant for the vehicle 1 approaching the intersection from the right (as that one is also heading towards the intersection center with a potential risk of collision).

Upon running the relevance verification algorithm, the selector 2 may then provide the vehicle 1 at the bottom with an ID or other identification (as part of the acknowledger list) of the other vehicle 1 in a suitable message. By processing this information, the vehicle 1 at the bottom may then immediately start requesting an acknowledgement from the other vehicle 1 from the right when transmitting CAM or other messages. This request can be made much earlier than in the example of FIG. 1.

As a consequence, the vehicle 1 approaching from the bottom can start checking for acknowledgements much earlier and can also much earlier implement reactions to increase broadcast transmission reliability and application performance. For example, considering reactions at radio access level, if acknowledgments are not received for a given message, the message can be retransmitted a number of times until it is received and acknowledged or until a given maximum number of retransmissions is reached. Alternatively, the transmitter can increase the transmission power, use more robust modulation/coding scheme, etc.

Usage of acknowledgments is not limited to considering reactions at radio access level, however, but can also be utilized at application level. For example, a collision avoidance application can be informed by the radio access level about whether acknowledgements have been received or not for given CAM messages. If answered in the affirmative, the respective application knows the other vehicle 1 is also aware of the collision risk. As a result, it can take "soft" reactions, e.g., mild deceleration while checking if the collision risk persists at subsequent instants. If answered in the negative, the application can assume that the other vehicle 1 is not aware of the collision risk. As a consequence, it can take "hard" reactions, e.g., strong decelerations while checking if the collision risk persists at subsequent instants.

Hence, more generally, when a broadcast acknowledgment is not received during the selective broadcast acknowledgment process of each vehicle, wireless transmission parameters of the respective vehicle and/or vehicle operation parameters depending on the respective vehicle application may be adjusted.

Figure 4:
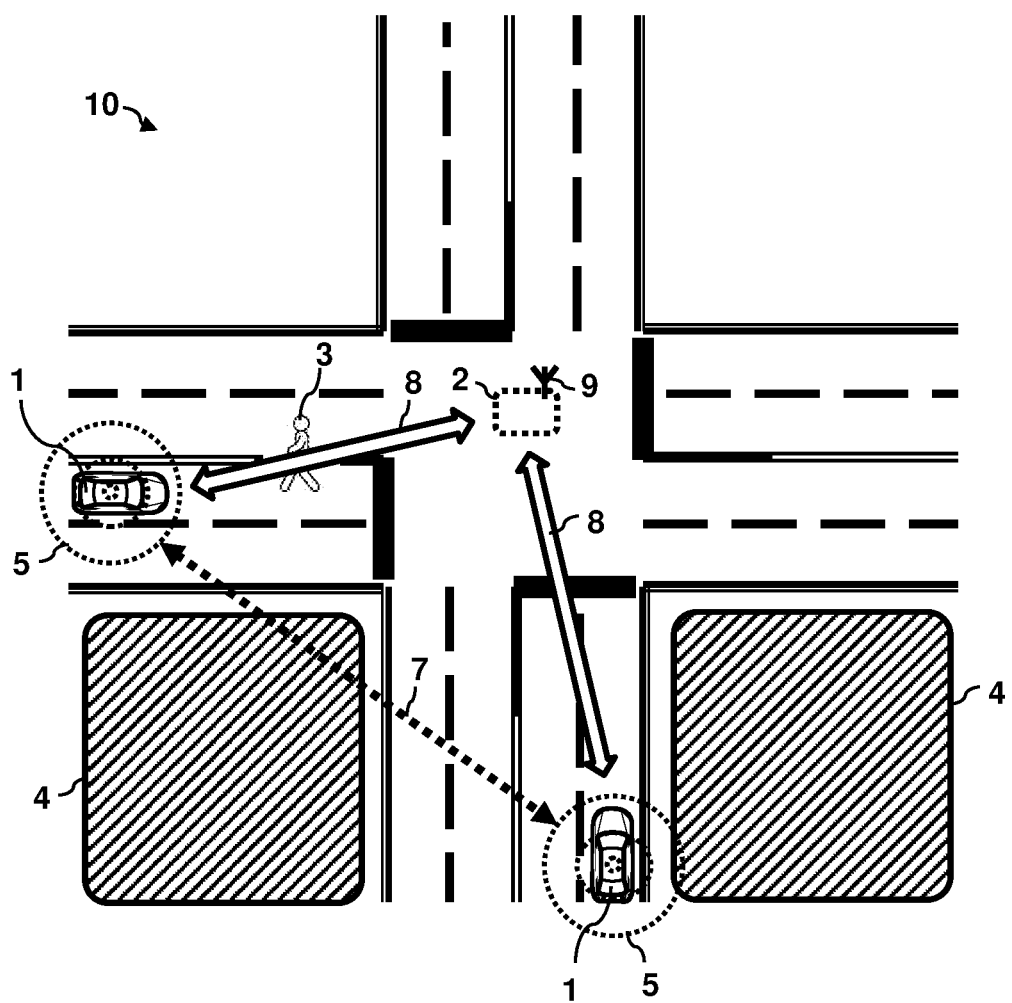
FIG. 4 shows another driving situation using the system of FIG. 3.

FIG. 4 shows another driving situation using the system 10 of FIG. 3.

In this case, the vehicles 1 may periodically broadcast CPM messages with ego position, speed, direction and/or position and dynamics of detected pedestrians or other traffic participants.

The acknowledger selector 2 placed at the intersection center overhears CPMs from all vehicles 1. When it receives a CPM from a vehicle (e.g., the one approaching the intersection from the left), the selector 2 may check the relevance for other vehicles 1 (e.g., the one approaching from the bottom) based on given application rules. Based on protection rules for vulnerable road users, CPMs from the vehicle 1 on the left are relevant for the vehicle 1 at the bottom (e.g., it is heading to the intersection with a speed implying possible collision risk with the pedestrian 3). Upon running relevance verification, the selector 2 includes the ID (or other identification) of the vehicle 1 approaching from below in a message containing the list of acknowledgers and transmits it to the vehicle 1 on the left. By processing this list, the vehicle 1 on the left can request acknowledgments from the other vehicle 1 when transmitting CPM messages.

Figure 5:
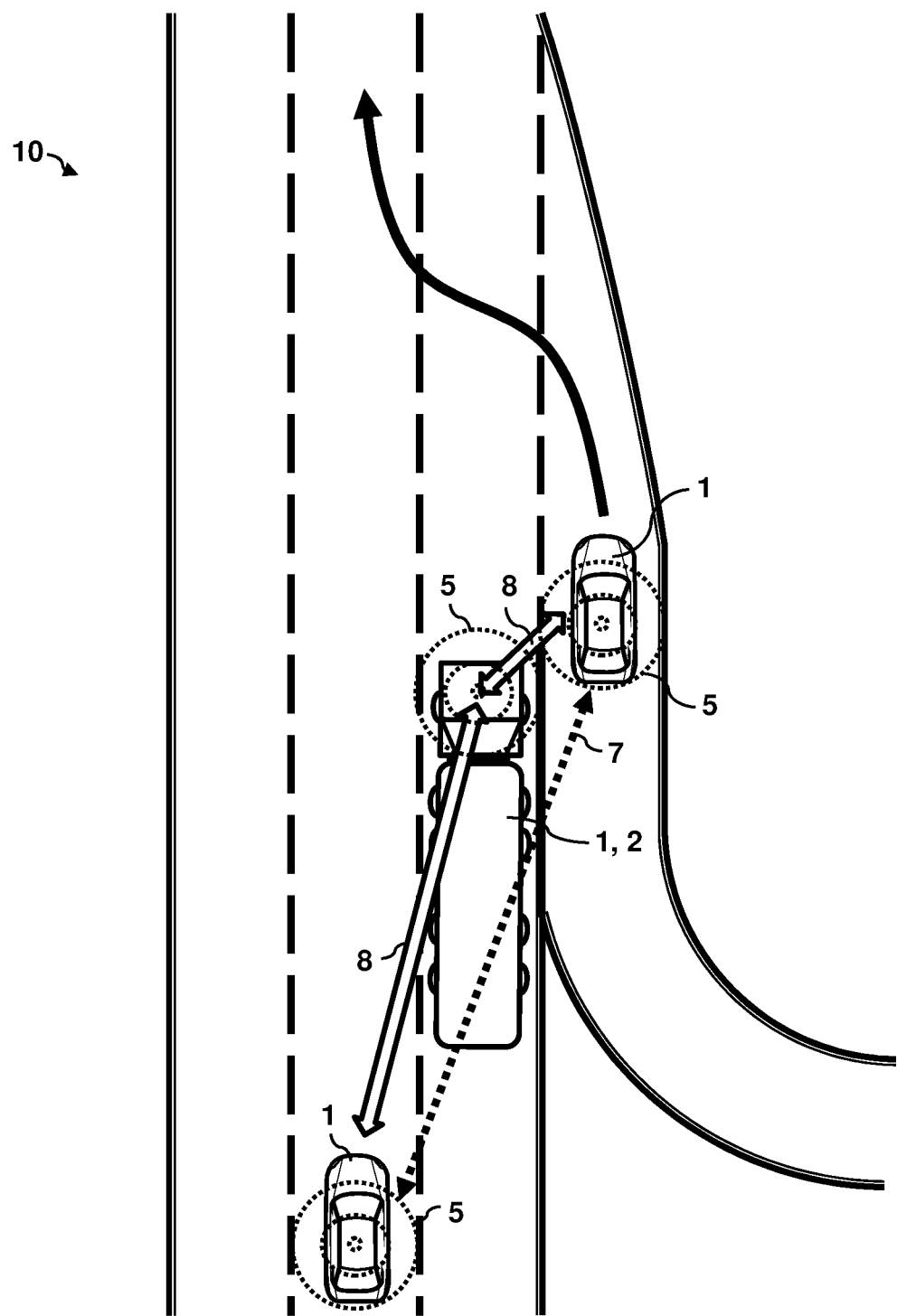
FIG. 5 shows a wireless vehicular communication system with selective broadcast acknowledgment.

FIG. 5 shows a wireless vehicular communication system 10 with selective broadcast acknowledgment.

In this example, the acknowledger selector 2 is not a roadside unit. Instead, its function is fulfilled by one of the vehicles 1, namely the truck in the center.

For example, all shown vehicles 1 may periodically broadcast MCM messages with ego position, speed, direction and/or desired and planned trajectory etc. The truck is located between the other two vehicles 1 in FIG. 5 and may thereby block their respective broadcast transmissions 5. However, as the truck also acts as acknowledgers selector 2, it receives MCM messages of both vehicles 1 and can thus verify their respective relevance for each other based on given application rules.

For example, based on safe lane merging rules, MCM messages from the vehicle 1 on the right may be relevant for the vehicle 1 on the left (e.g., vehicle 1 on the right wants to communicate the intention to travel to the same lane with a potential collision risk). Upon running relevance verification, the selector 2 includes an ID of the vehicle 1 at the bottom in a message containing the list of acknowledgers and transmits it to the vehicle 1 on the right. By processing this list, that vehicle 1 can request acknowledgements from the other vehicle 1 when transmitting MCM messages.

In the foregoing detailed description, various features are grouped together in one or more examples with the purpose of streamlining the disclosure. It is to be understood that the above description is intended to be illustrative, and not restrictive. It is intended to cover all alternatives, modifications and equivalents of the different features and embodiments. Many other examples will be apparent to one skilled in the art upon reviewing the above specification. The embodiments were chosen and described in order to explain the principles of the disclosure and its practical applications, to thereby enable others skilled in the art to utilize the disclosure and various embodiments with various modifications as are suited to the particular use contemplated.

The invention claimed is:
1. A method comprising:
receiving, by a computing device, a plurality of wireless messages from a plurality of vehicles having wireless communication capability, wherein the computing device is one of a stationary device or a mobile device;
storing, by the computing device and based on the plurality of received wireless messages, information for each vehicle of the plurality of vehicles;
determining, by the computing device, based on the stored information, and for a pair of vehicles of the plurality of vehicles, whether information from one vehicle of the pair of vehicles is relevant to operation of a vehicle application being executed on another vehicle of the pair of vehicles;
compiling, by the computing device and based on the determination, a plurality of acknowledger lists, wherein each acknowledger list of the plurality of acknowledger lists indicates, for a respective vehicle of the plurality of vehicles, one or more vehicles that are verified as being relevant to the respective vehicle;
transmitting each acknowledger list of the plurality of acknowledger lists to the respective vehicle; and
causing the plurality of vehicles to perform a selective broadcast acknowledgment process based on the plurality of acknowledger lists.

2. The method of claim 1, wherein the computing device is integrated in one of a roadside unit or a vehicle.

3. The method of claim 1, wherein the computing device communicates with the plurality of vehicles via vehicle-to-everything (V2X) communication.

4. The method of claim 1, further comprising:
supplementing the stored information with sensor data on the plurality of vehicles, wherein the sensor data is provided by a sensor system associated with the computing device.

5. The method of claim 1, wherein the vehicle application is related to vehicle safety, and wherein the plurality of wireless messages comprise at least one of a cooperative awareness message, a collective perception message, or a maneuver coordination message.

6. The method of claim 1, further comprising:
adjusting, based on a broadcast acknowledgment not being received during the selective broadcast acknowledgment process of each vehicle, at least one of a wireless transmission parameter of the respective vehicle or a vehicle operation parameter.

7. The method of claim 1, further comprising:
receiving, by the computing device, an acknowledgement reception confirmation indicating that each vehicle in an acknowledger list has positively acknowledged with the selective broadcast acknowledgment process; and
removing, by the computing device, each positively acknowledged vehicle from the acknowledger list.

8. A wireless vehicular communication system comprising:
a computing device configured as one of a stationary device or a mobile device, wherein the computing device comprises:
one or more processors, and
memory storing instructions that, when executed by the one or more processors, cause the computing device to:
receive a plurality of wireless messages from a plurality of vehicles having wireless communication capability;
store, based on the plurality of received wireless messages, information for each vehicle of the plurality of vehicles;
determine, based on the stored information and for a pair of vehicles of the plurality of vehicles, whether information from one vehicle of the pair of vehicles is relevant to operation of a vehicle application being executed on another vehicle of the pair of vehicles;
compile, based on the determination, a plurality of acknowledger lists, wherein each acknowledger list of the plurality of acknowledger lists indicates, for a respective vehicle of the plurality of vehicles, one or more vehicles that are verified as being relevant to the respective vehicle; and
transmit each acknowledger list of the plurality of acknowledger lists to the respective vehicle;
cause the plurality of vehicles to perform a selective broadcast acknowledgment process based on the plurality of acknowledger lists.

9. The wireless vehicular communication system of claim 8, wherein the computing device is integrated in one of a roadside unit or a vehicle.

10. The wireless vehicular communication system of claim 8, wherein the instructions, when executed by the one or more processors, further cause the computing device to communicate with the plurality of vehicles via vehicle-to-everything (V2X) communication.

11. The wireless vehicular communication system of claim 8, further comprising a sensor system, and wherein the instructions, when executed by the one or more processors, further cause the computing device to supplement the stored information with sensor data on the plurality of vehicles, wherein the sensor data is provided by the sensor system.

12. The wireless vehicular communication system of claim 8, wherein the vehicle application is related to vehicle safety, and wherein the plurality of wireless messages comprise at least one of a cooperative awareness message, a collective perception message, or a maneuver coordination message.

13. The wireless vehicular communication system of claim 8, wherein each vehicle of the plurality of vehicles is configured to adjust, based on a broadcast acknowledgement not being received during the selective broadcast acknowledgment process of the each vehicle, at least one of a wireless transmission parameter or a vehicle operation parameter.

14. The wireless vehicular communication system of claim 8, wherein the instructions, when executed by the one or more processors, further cause the computing device to:
receive, from a vehicle of the plurality of vehicles, an acknowledgement reception confirmation indicating that each vehicle in an acknowledger list of the vehicle has positively acknowledged with the selective broadcast acknowledgment process, and
remove each positively acknowledged vehicle from the acknowledger list.

15. A motor vehicle comprising:
one or more processors, and
memory storing instructions that, when executed by the one or more processors, cause the motor vehicle to:
send a wireless message to a computing device;
receive, from the computing device, an acknowledger list indicating one or more vehicles that are verified as being relevant to operation of a vehicle application being executed on the motor vehicle;
perform, based on the acknowledger list, a selective broadcast acknowledgement process with respect to the one or more vehicles; and
sending, to the computing device, an acknowledgement reception confirmation indicating that each vehicle of the one or more vehicles in the acknowledger list has positively acknowledged with the selective broadcast acknowledgement process.

\* \* \* \* \*